March 10, 1925.  1,529,507
J. RUNK
RECORD CLEANING ATTACHMENT
Original Filed May 13, 1921    2 Sheets-Sheet 1
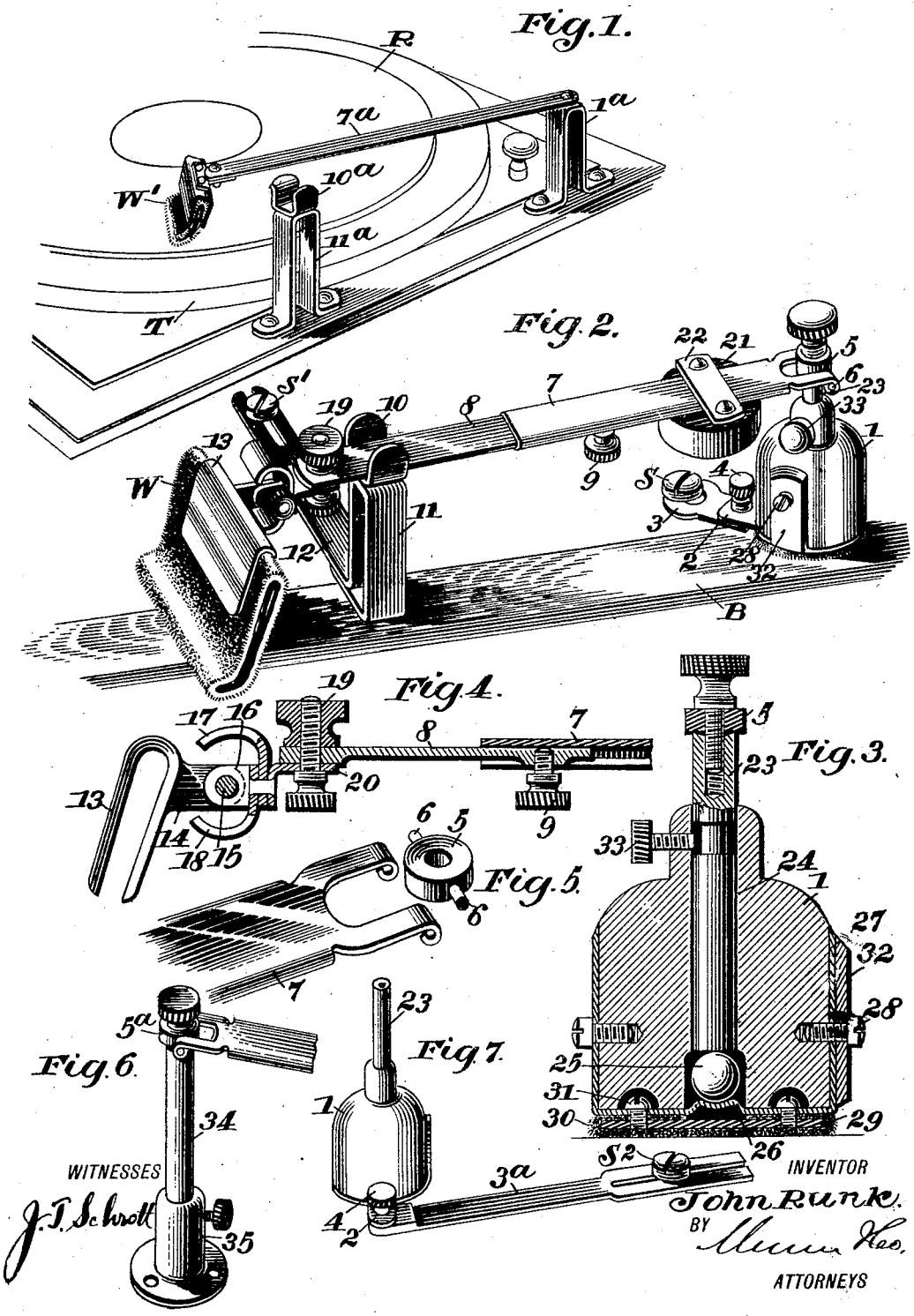

March 10, 1925.
J. RUNK
RECORD CLEANING ATTACHMENT
Original Filed May 13, 1921   2 Sheets-Sheet 2
1,529,507
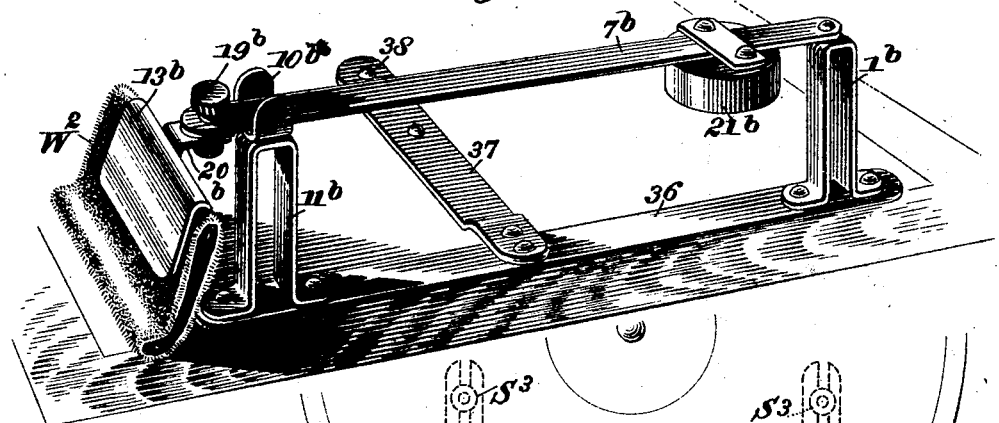
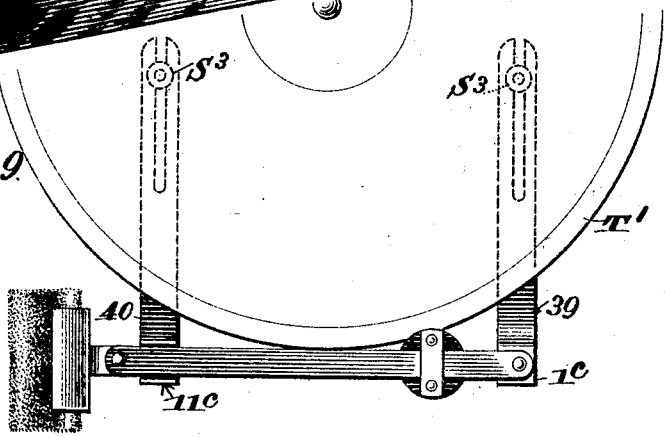
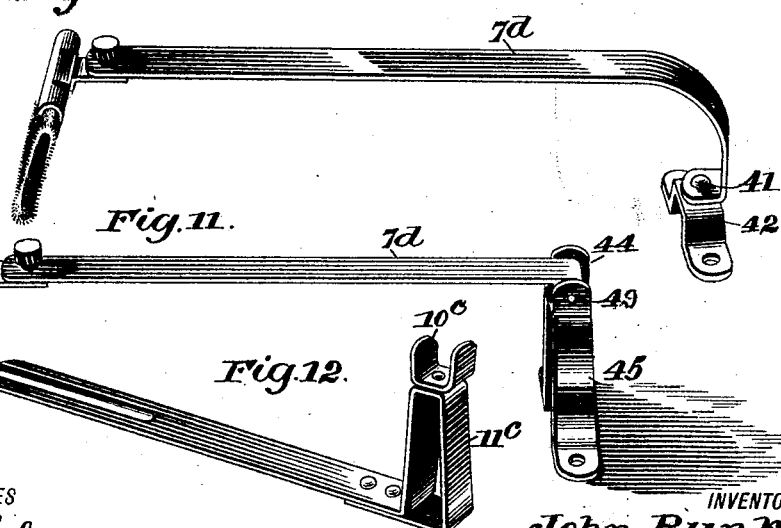
WITNESSES
J. T. Schrott.
INVENTOR
John Runk
BY
ATTORNEYS Patented Mar. 10, 1925.

1,529,507

UNITED STATES PATENT OFFICE.

JOHN RUNK, OF STILLWATER, MINNESOTA.

RECORD-CLEANING ATTACHMENT.

Application filed May 13, 1921, Serial No. 469,197. Renewed August 15, 1924.

*To all whom it may concern:*

Be it known that I, JOHN RUNK, a citizen of the United States, and a resident of Stillwater, in the county of Washington and State of Minnesota, have invented certain new and useful Improvements in Record-Cleaning Attachments, of which the following is a specification.

My invention relates to improvements in record cleaning attachments for phonographs, and it consists in the constructions, combinations and mode of operation herein described and claimed.

One of the foremost objects of the invention is to provide a phonograph record cleaner, attachable independently of the tone arm and therefore adaptable to all makes of machines.

A further object of the invention is to provide a phonograph record cleaning attachment which is attachable without visibly marring the cabinet.

More specifically stated, a further object of the invention is to provide a record cleaning attachment which is hinged to a support so that the wiper may be set on the record during playing, there being a rest on which the free end of the cleaning attachment is laid when the wiper is taken from the record.

Other objects and advantages will appear in the following specification, reference being had to the accompanying drawings, in which:

Figure 1 is a perspective view illustrating the simplest form of the invention,

Figure 2 is a perspective view illustrating a preferred embodiment of the invention, Figure 3 is a vertical section of the standard on which the wiper arm is universally movably mounted, Figure 4 is a detail section of the free end of the wiper arm, Figure 5 is a detail perspective view of the universal joint, Figure 6 is a detail perspective view illustrating a slight modification in the form of standard in Figure 2, Figure 7 is a detail perspective view showing how the standard in Figure 2 may be attached to one of the screws on the bed of the cabinet beneath the turntable, Figure 8 is a perspective view showing a modification of the cleaning attachment in Figure 2, wherein the standard and rest for the wiper arm are mounted on plates which have their attachment beneath the turntable, Figure 9 is a plan view illustrating how the standard and rest may be individually supported by bars running beneath the turntable, Figure 10 is a perspective view showing a modification in the manner of forming the hinge mounting for the wiper arm, Figure 11 is a perspective view showing a further slight modification in this mounting, and Figure 12 is a detail perspective view showing the rest in Figure 9 in detail.

As stated in the objects of the invention, the main purpose of the improved record wiper attachment herein disclosed being to produce a cleaning attachment which is adaptable to all styles of phonographs. To this end, the invention is an improvement on the phonograph record cleaning attachment disclosed in my co-pending application filed Dec. 26, 1918, Serial No. 268,346, which has issued as Patent No. 1,404,147, patented Jan. 17, 1922, wherein the main form of the invention is applicable to certain styles of tone arms.

That application also discloses the use of the standard in Figure 2 with its hingedly attached wiper arm, and in so far as this standard with an extensible wiper arm and means for attaching the standard to a screw on the bed of the cabinet beneath the turntable is concerned, this application is a continuation in part of the co-pending application referred to. Consider first the form in Figure 2.

The standard 1 has a lug 2 to which the bifurcated connector 3 is adjustably connected at 4. The connector 3 is fastened beneath one of the screws S which are to be found on the bed B of the phonograph cabinet beneath the turntable. The purpose of this manner of connection is to obviate marring exposed portions of the cabinet.

A universal joint, consisting of a washer 5 with trunnions 6, carries one of the two parts 7—8 of the wiper arm, which parts are telescopically fitted together, capable of longitudinal adjustment, and to be fixed in their adjustment by use of the thumb screw 9 beneath. When the cleaning attachment is not in use, the wiper arm is laid in the cradle 10 of the rest 11 which, like the standard 1, includes a connector bar 12 reaching beneath the turntable to a place of attachment at another screw S'. Here again, the purpose of this arrangement is to prevent marring the finish of the cabinet.

At the extremity of the wiper arm is a keeper 13 into which the fabric wiper W is slid endwise. The wiper bears on the record R (as shown for example in Figure 1) when the device is in operation. The wiper is made in a number of styles, as may be seen either in my co-pending application, Serial No. 268,346 above referred to, or another co-pending application Serial No. 372,026. The wiper may be made relatively broad or narrow. In any event, the wiper will travel inwardly as the record rotates (this by virtue of the fabric bearing in the spiral groove) so that the entire surface of the record is cleaned in advance of the stylus.

The keeper 13 includes the arm 14 which is adjustably connected at 15 to the lug 16 of the stop structure 17—18. By unloosening the set screw, the arm 14 may be adjusted up or down, but the adjustments are limited by the stops 17 and 18. A set screw 19 enables lateral adjustment of the stop structure, through the connection 20 with the screw. Briefly reviewing this form of the invention; the wiper arm 7—8 is laid in the cradle 10 when the cleaning attachment is not in use, but when it is intended to be used, the wiper arm is taken out of the cradle and the wiper W set on the record R, whereupon it acts in the manner described immediately above.

At any suitable place along the wiper arm 7—8 there is a weight 21, which is applied by means of the bridge 22 (or any other suitable means). The weight is slidable along the wiper arm so as to produce varying degrees of pressure of the wiper W on the record. The thumb screw 9 in Figure 2 may appear to be in the way of the weight, but in actual practice the thumb screw may be placed elsewhere (for example, farther out toward the end of the member 7) so as to give ample range for adjustments of the weight 21.

Attention is directed to Figure 3. The standard 1 is shown as made of solid metal. The stem 23 is revoluble in the central bore 24 and bears on an anti-friction ball 25 on the seat 26 at the bottom. The bearing seat is part of the yoke 27 which is held in place by screws 28. The plate 29, to which the plate 30 is suitably affixed, is secured to the yoke 27 by means of the screws 31, the heads of which occupy recesses in the bottom of the standard 1.

It is by removing the yoke 27 that a new pad plate may be applied to the standard 1. The standard 1 is equipped with a keeper plate 32, secured beneath the screw 28 at one side. In some instances, the standard 1 may be held in place on the bed of the cabinet by unloosening the screw 28, turning the plate 32 around, then inserting the long end of the plate into an adjacent seam.

A screw 33 occupying a groove in the stem 23, keeps the stem from pulling out but still permits the necessary rotational movement thereof. It is the combined rotational movement of the stem 23 and vertical pivotal movement of the wiper arm at the trunnion 6, that provides the universal joint for the wiper arm.

The standard shown in Figure 6 is only slightly different from the form shown in Figures 2 and 3. In the latter instance, the standard is more in the nature of a balance weight, either to be set on the bed of the cabinet and remain there by virtue of its own weight, or to be affixed by the means 3 and S shown. In the former instance, a rod 34 is made use of. The washer $5^a$ is fitted on top of the rod, preferably loosely, so as to obtain the advantage of horizontal circular motion. The rod is adjustably set in the base 35 which may either be secured to the bed of the cabinet or mounted by means equivalent to that by which the standard 1 in Figure 2 is mounted.

Figure 7 shows how a relatively long connector $3^a$ may be used in place of the short connector in Figure 2. The principle of mounting is the same in both instances, the connector $3^a$ being adapted to reach a screw $S^2$ farther under the turntable, than the screw S beneath which the connector 3 in Figure 2 is secured.

The form in Figure 1 is perhaps the simplest of all. Both the standard $1^a$ and rest $11^a$ are secured directly to the bed of the cabinet at an exposed place to one side of the turntable T. This arrangement is adaptable to some makes of machines, but of course it is preferable to mount the attachment in such a manner that the marring of the woodwork will be avoided. The rest 11 carries a cradle $10^a$ into which the wiper arm $7^a$ is placed when the wiper W' is removed from the record.

The modification in Figure 8, illustrates the use of a mounting plate 36 to the extremities of which both the standard $1^b$ and rest $11^b$ are affixed. This plate is not secured directly to the bed of the cabinet, but is fixed to a plate 37 which extends inwardly under the turntable and is in turn secured at 38 to the bed of the cabinet where the securing means will not show and where the resultant holes cannot greatly damage the finish. The wiper arm $7^b$ is of one piece like the arm $7^a$ in Figure 1.

It carries the slidable weight $21^b$, and at the free end the keeper $13^b$ carries the wiper $W^2$. The mounting means $20^b$ is circularly adjustable by the thumb screw $19^b$. The wiper arm rests in the cradle $10^b$.

The modification in Figure 9, shows both the standard $1^c$ and rest $11^c$ independently mounted by means of bars 39 and 40 respectively, which reach beneath the turntable T' and are secured beneath conveniently located screws $S^3$. In its other respects, the cleaning attachment is like that shown in Figure 8.

The modifications in Figures 10 and 11 differ only from the preceding forms (for example in Figures 1, 8 and 9) by disclosing a different type of hinge mounting for the wiper arm $7^d$. In Figure 10, the wiper arm has a vertical pivotal mounting 41 on a relatively low standard 42. There is enough resiliency in the arm $7^d$ to enable setting the arm on the rest that will be provided for it, and this resiliency will insure the wipers bearing on the records with a sufficient pressure to insure cleaning as the record revolves beneath the wiper.

In Figure 11 the arm $7^d$ has a horizontal pivot 43 in a cradle 44 which in turn is vertically pivotally mounted on a relatively high standard 45. In both cases, the standards may be affixed either to the bed of the machine or to bars like 39, for example, in Figure 9. Figure 12 is a detail view of the rest $11^e$ in Figure 9. The cradle $10^e$ may be mounted to swing on the vertical axis.

While the construction and arrangement of the improved record cleaning attachment as herein described and claimed, is that of a generally preferred form, obviously modifications and changes may be made without departing from the spirit of the invention or the scope of the claim.

I claim:—

An article of manufacture comprising a base structure, a standard adjacent to each end, a cleaning device, and an arm by which it is carried, pivotally mounted on one standard and adapted to be supported on the other standard which serves as a rest.

JOHN RUNK.